BEST AVAILABLE COPY
B. A. SLOCUM.
PHOTOGRAPHIC SHUTTER OPERATOR.
APPLICATION FILED SEPT. 4, 1914.
1,154,892.
Patented Sept. 28, 1915.
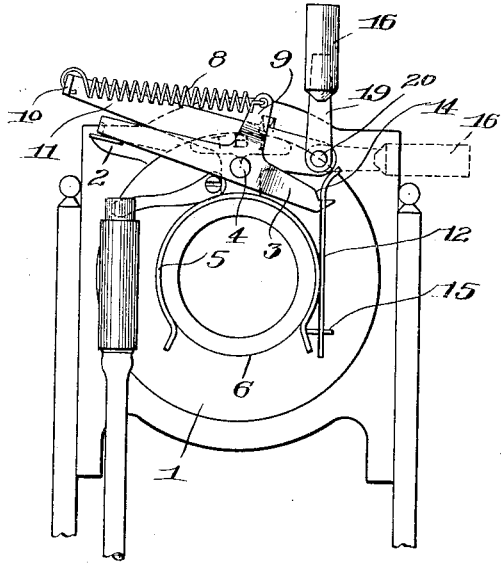
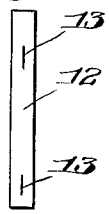
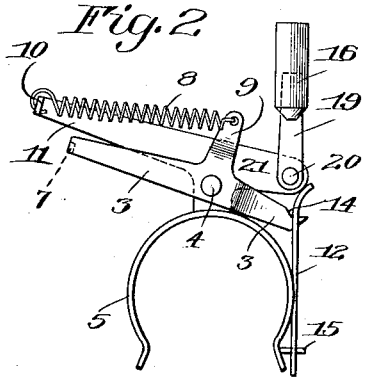
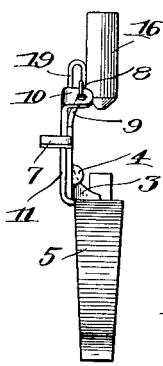
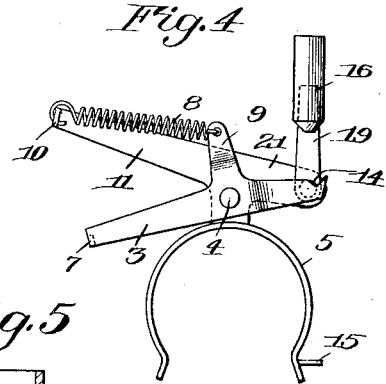
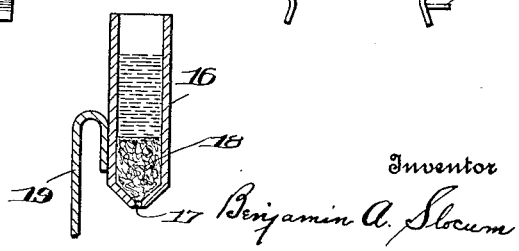
Witnesses
Ada W. Whitmore
Burton C. Coons.
Inventor
Benjamin A. Slocum
By H. H. Simms
his Attorney

UNITED STATES PATENT OFFICE.

BENJAMIN A. SLOCUM, OF ROCHESTER, NEW YORK.

PHOTOGRAPHIC-SHUTTER OPERATOR.

1,154,892.  Specification of Letters Patent.  Patented Sept. 28, 1915.

Application filed September 4, 1914. Serial No. 860,168.

*To all whom it may concern:*

Be it known that I, BENJAMIN A. SLOCUM, of Rochester, in the county of Monroe and State of New York, have invented a new and useful Improvement in Photographic-Shutter Operators, which improvement is fully set forth in the following specification and shown in the accompanying drawings.

The present invention relates to photographic shutter operators in which provision is made for automatically operating the shutter after a period of time in order that the user of a camera may include himself in the picture to be taken, an object of this invention being to provide a construction which may utilize water or other liquids for effecting the operation of the shutter.

To this and other ends, the invention consists in certain parts and combinations of parts all of which will be hereinafter described, the novel features being pointed out in the appended claims.

In the drawings: Figure 1 is a front view of a photographic shutter of known construction with the shutter operator attached thereto in position to operate the shutter; Fig. 2 is a front view of the shutter operator detached from the shutter and in set position; Fig. 3 is a side elevation of the shutter operator; Fig. 4 shows a front view of the shutter operator before the material, which is readily destructible by water, is applied thereto; Fig. 5 is a detail sectional view through the drop forming device; and Fig. 6 is a detail view of the element which is readily destructible by water.

While the invention is herein illustrated in an attachment for automatic shutters in which an actuating member is employed for effecting the opening and closing of the shutter, it is apparent that the invention may be employed in connection with any type of shutter in which it is possible to employ a motor member which will effect the opening and closing of a shutter blade, the present invention employing an element which is readily destructible by a liquid, such as water, for the purpose of freeing the motor member after a period of time to permit said motor member to effect the opening and closing of the shutter.

Referring more particularly to the drawings, 1 indicates the photographic shutter and 2 the actuating lever thereof, which, when moved in one direction, effects the opening and the closing of the shutter in a manner well known in this art.

A motor member 3 preferably in the form of a lever is pivoted at 4 to an attaching frame which may embody a spring clasp 5 in the form of a segmental ring adapted to conform to and fit over the lens tube 6 of a shutter 1 to support the pivot 4 above the lens tube so that one end of the lever 3, which is turned laterally at 7, may coöperate with the shutter actuating member 2. The motor member 3 may be moved in the direction to depress the lever 2 by means of a spring 8 which may be in the form of a coil attached at one end to a lateral arm 9 on the lever 3 and at the other end to a lateral extension 10 on an arm 11 which extends from the attaching frame.

For holding the motor member 3 with energy stored in the spring, as shown in Figs. 1 and 2, there is employed an element which has high capillary attraction and is readily destructible by a liquid. In this instance, this element is in the form of a strip 12 of blotting paper preferably having slits 13 near opposite ends in order to serve as a connection between the motor member and a relatively fixed part. The end of the motor member opposite that which coöperates with the actuating lever 2 may be provided with a notch 14 in its upper edge so that when the end of the lever 3 is passed through a slit 13 in the element 12, said element will not slip off of such end. The other end of the element 12 is anchored to a projection 15 on one of the clasps 5 by fitting said projection into the other slit of the element 12. Under normal conditions, this blotting paper is of sufficient strength to hold the motor member against movement under the action of the spring 8, but if this blotting paper be moistened, the energy in the motor member will cause it to break or destroy the element 12 to operate the actuating member 2.

It is desirable to so control the liquid that the liquid will be delivered to the element 12 after a period of time which will permit the user of the camera to position himself in front of the camera. This is preferably effected by a drop-forming device which may comprise a container 16 to which a liquid such as water may be delivered by a fountain pen filler or other suitable means, the container discharging through a restricted opening 17 in the bottom thereof onto the element 12 in proximity to that portion engaged by the motor member. To still further retard the flow of the liquid, absorbing cotton 18 may be introduced into the bottom of the container. In this instance, the container is supported by a bracket 19 which is pivoted at 20 to an arm 21 on the attaching device, the purpose of this pivot being to permit the container to be shifted at an angle to the position shown in Fig. 1 so that it may be arranged upright when the camera shutter is turned 90° as is common in taking pictures.

In the use of the device, the user first detaches the shutter operator from the camera shutter and moves the motor member 3 to store energy in the spring 8. The strip 12 is then connected to the motor member 3 and the projection 15 in order to hold the motor member in its shifted position. The attachment is then applied to the camera so that the end 7 of the motor member lies above the actuating member 2. A small amount of water is then deposited within the container 16 and thereafter there will form gradually a drop of water on the bottom of the container about the outlet 17. When this drop reaches a certain size, it falls on the strip 12 in proximity to the slit 13 and almost immediately, said strip is destroyed, freeing the motor member 3 and permitting the latter to operate the shutter. The time between that at which the water is deposited in the container and that at which the drop reaches the element 12 is sufficient to permit the user to position himself in front of the camera in order that he may be included within the picture.

I believe myself to be the first to provide a shutter operator controlled by a liquid and also to be the first to mount a shutter operator on the lens tube of a shutter.

What I claim as my invention, and desire to secure by Letters Patent is:

1. A photographic shutter operator embodying means adapted to effect the opening and closing of a shutter, and an element having a high capillary attraction and readily destructible by a liquid for causing such means to act.

2. A photographic shutter operator embodying means adapted to effect the opening and closing of a shutter, an element readily destructible by a liquid for causing said means to act, and means associated with said operating means for supplying liquid to said element.

3. A photographic shutter operator comprising a motor member for operating the shutter, and an element having a high capillary attraction and readily destructible by a liquid for holding said motor member against action.

4. A photographic shutter operator comprising a motor member for operating the shutter, an element readily destructible by a liquid for holding said motor member against action and a drop forming device for supplying a drop of liquid to the readily destructible element.

5. A photographic shutter operator comprising a motor member for operating the shutter, an element readily destructible by a liquid for holding said motor member against action, and a drop forming device for supplying a drop of liquid to the readily destructible element comprising a container having a restricted outlet.

6. A photographic shutter operator comprising a pivoted motor member for operating the shutter, a spring for moving said member in one direction, and an element having a high capillary attraction and readily destructible by a liquid for holding said motor member against movement under the action of the spring.

7. A photographic shutter operator embodying a motor member, an element readily destructible by a liquid for causing such motor member to act, and a drop forming device adapted to assume two positions at angles to each other, and to discharge on the said element in both positions.

BENJAMIN A. SLOCUM.

Witnesses:
ADA M. WHITMORE,
HAROLD H. SIMMS.

Copies of this patent may be obtained for five cents each, by addressing the "Commissioner of Patents, Washington, D. C."